United States Patent
Feuchter et al.

(10) Patent No.: US 9,952,578 B2
(45) Date of Patent: Apr. 24, 2018

(54) METHOD AND SYSTEM FOR ACTUATING AT LEAST ONE ACTUATOR

(75) Inventors: Wilfried Feuchter, Kupferzell (DE); Andreas Heyl, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1878 days.

(21) Appl. No.: 13/381,544

(22) PCT Filed: Jun. 1, 2010

(86) PCT No.: PCT/EP2010/057649
§ 371 (c)(1),
(2), (4) Date: Mar. 26, 2012

(87) PCT Pub. No.: WO2011/000651
PCT Pub. Date: Jan. 6, 2011

(65) Prior Publication Data
US 2012/0185145 A1    Jul. 19, 2012

(30) Foreign Application Priority Data

Jul. 1, 2009  (DE) .................. 10 2009 027 369

(51) Int. Cl.
G05B 19/04    (2006.01)
G05B 19/042   (2006.01)

(52) U.S. Cl.
CPC ............ *G05B 19/0428* (2013.01); *G05B 2219/24177* (2013.01)

(58) Field of Classification Search
CPC .............. G05B 19/0428; G05B 2219/24177
USPC .... 318/564, 568.24; 700/246–247, 249–257; 701/15–18, 99–102, 110–123
See application file for complete search history.

(56) References Cited

U.S. PATENT DOCUMENTS

| | | | | |
|---|---|---|---|---|
| 4,841,209 A | * | 6/1989 | Poumakis | 318/564 |
| 5,428,745 A | * | 6/1995 | de Bruijn et al. | 726/3 |
| 6,334,084 B1 | * | 12/2001 | Moteki et al. | 701/114 |
| 6,647,301 B1 | * | 11/2003 | Sederlund et al. | 700/79 |
| 6,845,467 B1 | * | 1/2005 | Ditner et al. | 714/11 |
| 6,965,206 B2 | * | 11/2005 | Kamen et al. | 318/139 |

(Continued)

FOREIGN PATENT DOCUMENTS

| | | |
|---|---|---|
| DE | 10 2006 047 026 | 4/2008 |
| JP | 61-23204 | 1/1986 |

(Continued)

OTHER PUBLICATIONS

International Search Report for PCT/EP2010/057649, dated Sep. 3, 2010.

*Primary Examiner* — David Hamaoui
*Assistant Examiner* — Carl Staubach
(74) *Attorney, Agent, or Firm* — Norton Rose Fulbright US LLP; Gerard Messina

(57) ABSTRACT

In a method for actuating at least one actuator, two control units and a selection logic are provided, and each of the control units is designed to influence the actuator. Each of the control units performs a self-diagnosis, and each of the control units generates at least one activating signal as a function of the self-diagnosis. The activating signal indicates which of the control units is to be activated. The selection logic activates one of the two control units for influencing the actuator as a function of the activating signals.

10 Claims, 2 Drawing Sheets

(56) References Cited

U.S. PATENT DOCUMENTS

| | | | |
|---|---|---|---|
| 7,870,417 B2* | 1/2011 | Blinick et al. | 714/4.11 |
| 2012/0078575 A1* | 3/2012 | Feuchter et al. | 702/182 |

FOREIGN PATENT DOCUMENTS

| | | |
|---|---|---|
| JP | 6-348521 | 12/1994 |
| JP | 2003-256001 | 9/2003 |
| RU | 2 223 532 | 2/2004 |
| WO | WO 2005/093531 | 10/2005 |

* cited by examiner

| Nr. | AA | AB | BA | BB | U |
|---|---|---|---|---|---|
| 1 | H | H | H | H | B |
| 2 | H | H | H | L | B |
| 3 | H | H | L | H | B |
| 4 | H | H | L | L | B |
| 5 | H | L | H | H | A |
| 6 | H | L | H | L | B |
| 7 | H | L | L | H | B |
| 8 | H | L | L | L | A |
| 9 | L | H | H | H | A |
| 10 | L | H | H | L | B |
| 11 | L | H | L | H | A |
| 12 | L | H | L | L | A |
| 13 | L | L | H | H | A |
| 14 | L | L | H | L | B |
| 15 | L | L | L | H | B |
| 16 | L | L | L | L | B |

Fig. 2

METHOD AND SYSTEM FOR ACTUATING AT LEAST ONE ACTUATOR

BACKGROUND OF THE INVENTION

1. Field of the Invention

The present invention relates to a method and a system for actuating at least one actuator.

2. Description of Related Art

The so-called 1oo2 systems (1oo2=1 out of 2) are known, in which a selection logic decides which of two control units is to be activated. The decision is made as a function of the activating signals supplied to the selection logic. The activating signals are generated by higher-level diagnosis and monitoring devices which continuously check the two control units with respect to their reliability performance. The implementation of these diagnosis and monitoring devices, in particular, is associated with a high degree of hardware and software expenditure.

A system and a method for switching a control between redundant control units are known from U.S. Pat. No. 6,845,467 B1. During this process, the status of the two redundant control units is monitored to determine whether it is necessary to switch the control between the control units. The monitoring and the switchover system are hardware-based and the control is implemented via a state machine. Status signals are generated which correspond to the status of the control units to which they are assigned.

BRIEF SUMMARY OF THE INVENTION

It is an object of the present invention to provide a system of the type mentioned at the outset which requires less effort with respect to the ongoing monitoring.

In the present invention, each of the control units performs a self-diagnosis. As a function of the self-diagnosis, each of the control units subsequently generates at least one activating signal indicating which of the control units is to be activated. The selection logic then activates one of the two control units for influencing the actuator as a function of the activating signals.

Both control units perform a self-diagnosis according to the present invention. Thus, there is no need for an additional hardware expenditure for a higher-level diagnosis and monitoring device. The self-diagnosis may essentially instead be implemented solely with the aid of additional software in the particular control units. The system according to the present invention thus provides a substantial simplification and cost reduction.

In an advantageous refinement of the present invention, at least one of the two control units has a processor and a watchdog, the processor being continuously checked by the watchdog for possible errors, and an error signal being generated by the watchdog in the case of an error, as a function of which the activating signal(s) of the associated control unit is/are generated. The so-called watchdog is a device which may be implemented without a higher degree of expenditure.

BRIEF DESCRIPTION OF THE DRAWINGS

FIG. 2 shows a table for use in the system of FIG. 1.

DETAILED DESCRIPTION OF THE INVENTION

Figure 1:
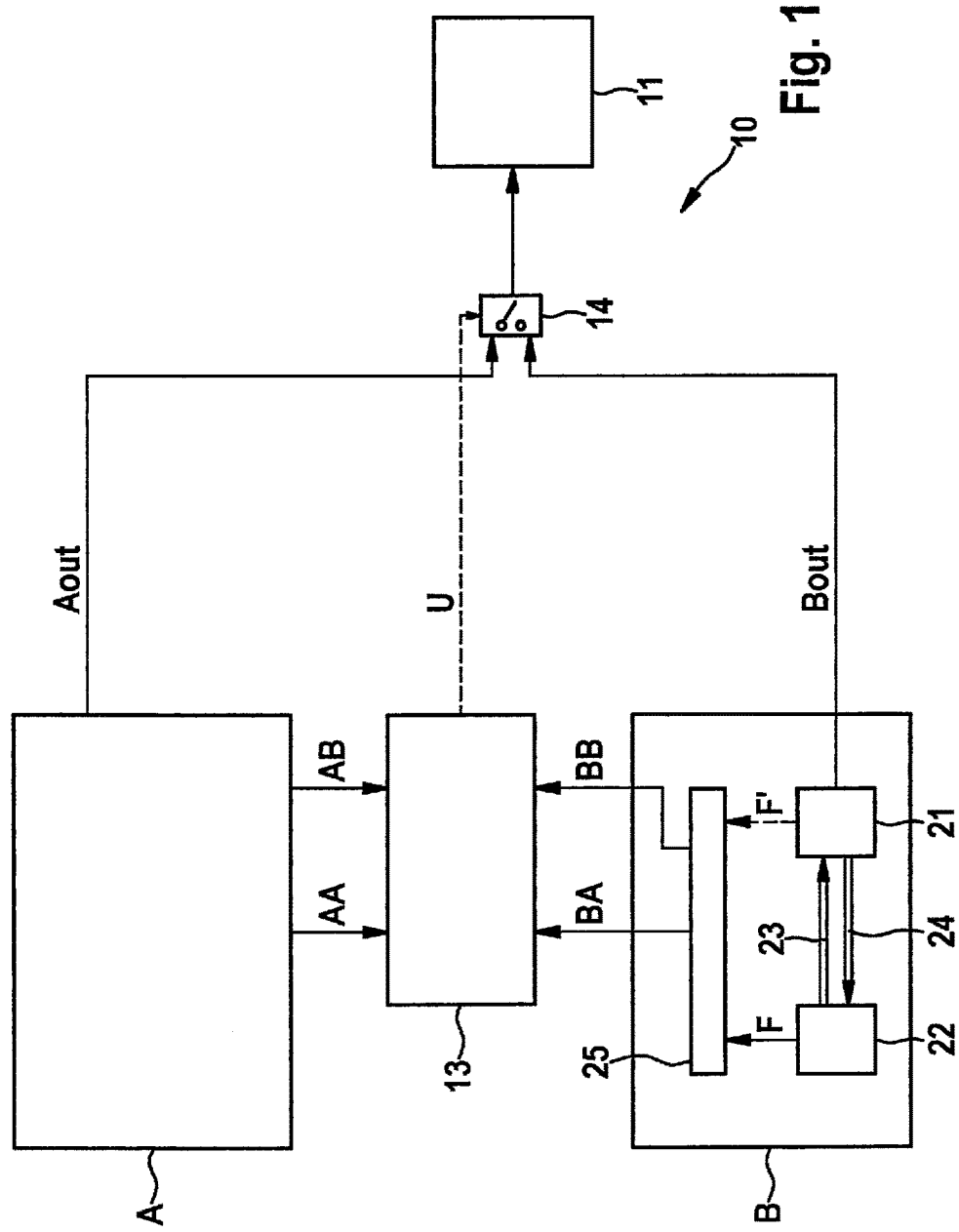
FIG. 1 shows a schematic block diagram of an exemplary embodiment of a system according to the present invention for actuating at least one actuator.

FIG. 1 shows a system 10 which is provided for actuating at least one actuator 11. System 10 has two control units A, B as well as a selection logic 13. Control unit A generates two activating signals AA, AB which are supplied to selection logic 13, and control unit B generates two activating signals BA, BB which are also supplied to selection logic 13. Furthermore, each of the control units A, B generates an actuating signal Aout, Bout which is provided for actuating actuator 11. Actuating signals Aout, Bout are supplied to the two inputs of a selector switch 14 whose output is connected to actuator 11. The switching position of selector switch 14 is predefined by selection logic 13 via a switchover signal U.

In a way not shown, one or multiple input signals are applied to both control units A, B. Preferably, the same input signals are applied to both control units A, B. These input signals, just as the two actuating signals Aout, Bout, may be digital or analog signals.

Each of two control units A, B is designed to influence actuator 11 as a function of the input signals. Each of two control units A, B is capable of actuating actuator 11 as desired completely independently from the other control unit B, A.

Furthermore, each of two control units A, B is designed to check itself. Each of two control units A, B may thus perform a self-diagnosis. This self-diagnosis of one of two control units A, B takes place independently from the other control unit B, A.

As a function of its self-diagnosis, each of two control units A, B generates its activating signals AA, AB, BA, BB. All four activating signals AA, AB, BA, BB are received by selection logic 13. With the aid of the table in FIG. 2, selection logic 13 generates switchover signal U and thus controls selector switch 14. As a consequence, selector switch 14 is switched to a certain switching position assigned to one of two control units A, B. Selector switch 14 thus relays only actuating signal Aout, Bout of that control unit A, B to actuator 11 which has been selected with the aid of switchover signal U.

Four activating signals AA, AB, BA, BB may each have a logical value "L" or "H," in the present exemplary embodiment a logic being assumed in which value "L" identifies a desired status.

If activating signal AA has, for example, the value "H" and activating signal AB the value "L," this means that control unit A wants to have control unit B activated as a desired status. This desired status of control unit A may, for example, arise when control unit A determines during self-diagnosis that it does not work completely error-free. In this case, control unit A does not want to be active itself and thus generates activating signal AA with the value "H." Instead, control unit A wants control unit B to be active and thus generates activating signal AB with the value "L."

In the table of FIG. 2 all possible combinations of four activating signals AA, AB, BA, BB are entered and provided with numbers from 1 through 16. Each combination further includes which of two control units A, B is activated with the aid of switchover signal U, or the switching position of selector switch 14.

The case explained above, where control unit A generates activating signals AA=H and AB=L, is entered in the table of FIG. 2 with combination 6, for example. There, control unit B generates activating signals BA=H and BB=L. This means that both control units A, B agreeably want control unit A to be not active, but want control unit B to be active. This thus represents a normal state for activating control unit B.

In combination 5, control unit A wants control unit B to be activated. Control unit B, however, generates activating signals BA=BB=H. The fact that control unit B wants to deactivate itself as well as control unit A is not plausible and indicates that control unit B is no longer operational. For this reason, a switch is made in this case over to control unit A, although control unit A itself does not want to be activated.

The situation is similar in combination 8. Here, control unit B wants to activate itself and control unit A at the same time based on activating signals BA=BB=L. This is not plausible and indicates that control unit B is no longer operational. For this reason, a switch is made over to control unit A in this case as well, although control unit A itself does not want to be activated.

In combination 7, control units A, B generate activating signals which are opposed to each other. Control unit A wants, for example, to deactivate itself and to activate control unit B, while control unit B does not want to be activated at that moment, but wants to activate control unit A. According to the table of FIG. 2, control unit B is activated, by definition, in this case.

In combination 11, both control units A, B want control unit A to be activated. The combination thus represents the normal state for activating control unit A.

In combinations 9 and 12, the activating signals of control unit B are not plausible. For this reason, control unit A, which itself also wants to be activated, is activated in these cases. Similarly, in combination 13 control unit A is activated.

In combination 10, control units A, B generate activating signals which are opposed to each other. According to the table of FIG. 2, control unit B is activated, by definition, in this case.

In combinations 2, 3 and 4, at least the activating signals of control unit A are not plausible. Thus, it is always switched over to control unit B in these cases, even if control unit B itself does not want to be activated. Similarly, in combinations 14 and 15, the activating signals of control unit A are not plausible. Control unit B is therefore activated in these cases as well.

In combinations 1 and 16, all four activating signals are not plausible. This results in control unit B being activated, by definition, in both cases.

Thus, in all possible combinations of activating signals AA, AB, BA, BB, one of two control units A, B is activated. This is achieved with the aid of switchover signal U by accordingly positioning selector switch 14. Actuator 11 is then influenced by actuating signal Aout, Bout of the selected control unit A, B.

As previously explained, there are combinations in which one of two control units A, B is activated, although it does not want to be activated itself. This is the case in combination 5, for example. If a similar or comparable combination occurs, it is additionally possible to communicate this state to a higher-level control or to the user. The higher-level control or the user may then correctively intervene in system 10 of FIG. 1 and may, in contrast to the table in FIG. 2, select and activate one of two control units A, B based on completely different criteria.

The design of two control units A, B is illustrated in FIG. 1 using control unit B as an example and is explained below with reference to control unit B. It is understood that control unit A may be designed accordingly.

Control unit B has a processor 21 and a so-called watchdog 22. Processor 21 is responsible, among other things, for generating actuating signal Bout. Watchdog 22 has the function of continuously checking the reliability performance of processor 21. This is identified with arrow 23 in FIG. 1. Conversely, processor 21 continuously checks the reliability performance of watchdog 22. This is identified with arrow 24 in FIG. 1.

If watchdog 22 detects a malfunction of processor 21, watchdog 22 generates an error signal F. This error signal F may contain information about the error type of processor 21.

If processor 21 detects a malfunction of watchdog 22, processor 21 changes its mode of operation in such a way that it seems to watchdog 22 as if processor 21 does not work properly. Based on this alleged malfunction of processor 21, watchdog 22 generates the previously mentioned error signal F. Alternatively or additionally, it is possible for processor 21 to generate an error signal F' which is transmitted independently of watchdog 22.

Error signal F and, possibly, error signal F' are supplied to a circuit 25 which generates two activating signals BA, BB of control unit B as a function of error signal F, F'.

The values "L," "H" for activating signals BA, BB may be dependent on information with respect to the error type, which may be contained in error signal F, F'. For example, if watchdog 22 detects a complete failure of processor 21, this may result in other values "L," "H" for activating signals BA, BB than in the case of a temporary interference of the checking activity of watchdog 22.

With the aid of the explained design of control unit B it is, for example, achieved that a complete failure of processor 21 is detected by watchdog 22 and is further communicated to selection logic 13 via circuit 25. Circuit 25 may be designed in such a way that even if neither processor 21 nor watchdog 22 are operational, the values "L," "H" of activating signals BA, BB may be generated in such a way that control unit B is deactivated.

What is claimed is:

1. A method for actuating at least one actuator, comprising:
providing two control units and a selection logic, wherein each of the control units is configured to selectively influence the actuator;
performing, by each one of the two control units, a self-diagnosis;
generating, by each one of the two control units, two activating signals as a function of the self-diagnosis by each control unit, wherein one of the two activating signals generated by each respective control unit is assigned to a first control unit and the other one of the two activating signals generated by each respective control unit is assigned to a second control unit, and wherein each of the two activating signals indicates whether the assigned control unit is to be one of activated or not activated; and
activating, by the selection logic, one of the two control units for influencing the actuator as a function of the four activating signals generated by the two control units.

2. The method as recited in claim 1, wherein the selection logic determines whether the activating signals generated by the two control units are plausible, and wherein the selection unit activates the first control unit if the activating signals generated by the second control unit are not plausible.

3. The method as recited in claim 2, wherein the first control unit is activated even if the activating signals generated by the first control unit indicates that the first control unit is to be not activated.

4. The method as recited claim 1, wherein the selection logic determines whether the activating signals generated by the two control units are plausible, and wherein the selection unit activates one of the two control units if all the activating signals are not plausible.

5. The method as recited in claim 1, wherein the selection logic activates a control unit which is indicated to be activated by both the assigned activating signal generated by the first control unit and the assigned activating signal generated by the second control unit.

6. The method as recited in claim 1, wherein:
- at least one of the two control units has a processor and a watchdog;
- the watchdog continuously checks for possible errors in the processor;
- an error signal is generated by the watchdog in the case of an error; and
- the control unit having the processor and the watchdog generates the activating signals as a function of the error signal.

7. A system for actuating at least one actuator, comprising:
- a first control unit and a second control unit, wherein each of the control units is configured to (i) selectively influence the actuator, (ii) perform a self-diagnosis, and (iii) generate two activating signals as a function of the self-diagnosis, one of the two activating signals being assigned to the first control unit and the other one of the two activating signals being assigned to the second control unit, and wherein each of the two activating signals indicates whether the assigned control unit is to be one of activated or not activated; and
- a selection logic configured to activate one of the two control units for influencing the actuator, as a function of the four activating signals generated by the two control units.

8. The system as recited in claim 7, wherein a table is implemented in the selection logic, and wherein the table indicates a control unit to be activated for each combination of the four activating signals.

9. The system as recited in claim 8, wherein:
- at least one of the two control units has a processor and a watchdog;
- the watchdog continuously checks for possible errors in the processor;
- an error signal is generated by the watchdog in the case of an error; and
- the control unit having the processor and the watchdog generates the activating signals as a function of the error signal.

10. The system as recited in claim 8, wherein the control units are provided for controlling an actuator of an internal combustion engine.

\* \* \* \* \*